Aug. 19, 1969  R. P. MEISTER ET AL  3,462,579
APPARATUS FOR GUIDING ELECTRODES
Original Filed Oct. 20, 1965
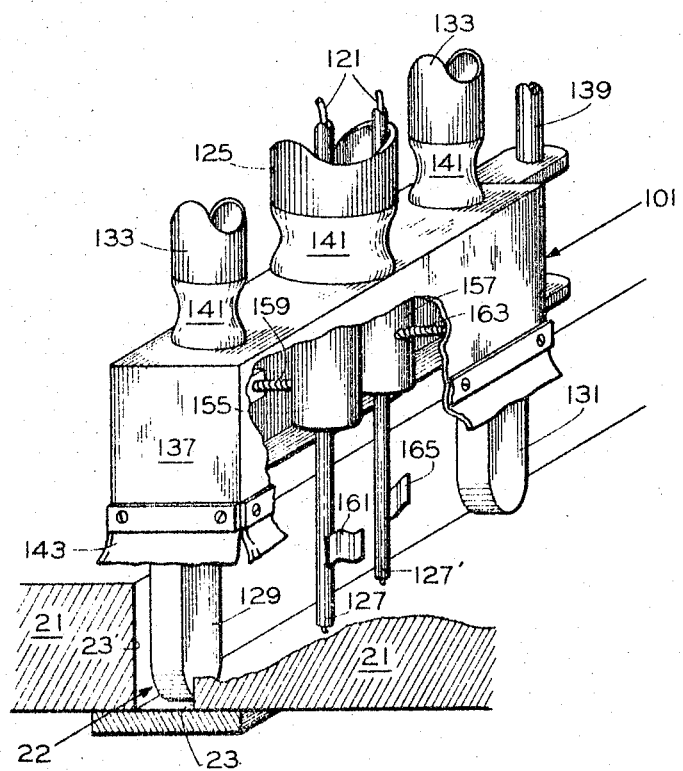
INVENTOR.
ROBERT P. MEISTER
BY JEROME W. NELSON United States Patent Office 3,462,579
Patented Aug. 19, 1969

3,462,579
APPARATUS FOR GUIDING ELECTRODES
Robert P. Meister, Columbus, Ohio, and Jerome W. Nelson, Houston, Tex., assignors, by mesne assignments, to The Battelle Development Corporation, Columbus, Ohio, a corporation of Delaware
Original application Oct. 20, 1965, Ser. No. 498,734, now Patent No. 3,328,556, dated June 27, 1967. Divided and this application Oct. 8, 1968, Ser. No. 765,845
Int. Cl. B23k 9/12
U.S. Cl. 219—125                    6 Claims

ABSTRACT OF THE DISCLOSURE

An electrode guiding apparatus for automatic welding along a joint between metal plates comprising a welding head mounted on a moveable carriage, means biasing an electrode suspended in the welding head toward one of the joint sidewalls, and spacing means intermediate the electrode and the joint sidewall toward which the electrode is biased for maintaining the electrode at a constant predetermined lateral distance from the sidewall regardless of irregularities in the sidewall.

---

This application is a divisional of our copending application Ser. No. 646,715, filed June 16, 1967, which is a divisional of application Ser. No. 498,734, filed Oct. 20, 1965, now U.S. Patent No. 3,328,556, granted June 27, 1967.

BACKGROUND OF THE INVENTION

This invention relates to guide apparatus for use in welding thick plate materials separated by a groove. In its broad aspects, the apparatus has application to all thick plat structures for downhand welding and for out-of-position welding. The apparatus of this invention provides means by which the welding electrodes are always properly positioned with respect to the sides of the joint regardless of joint irregularities or variations in the joint width.

The apparatus of this invention can be used for straight flat welds of abutting and T members, e.g., joints or seams in flat and curved plates. Flat or curved plates may be welded in various positions and from various directions, vertical, horizontal, overhead, or otherwise.

The apparatus of this invention has wide flexibility. The apparatus can be used with one filler wire or with several filler wires. When using two filler wires the width of the joint gap can vary substantially and good sidewall fusion can be maintained. The filler wires are preferably positioned on opposite sides of the longitudinal center line of the joint with one filler wire guided along at a fixed distance from one joint edge and the other guided along at a fixed distance from the opposite joint edge. With this unique procedure the groove opening may vary and sidewall fusion will be maintained.

When two filler wires are used, the filler wires may be connected to a single D-C power source or each electrode may be connected to separate D-C power sources. When a single D-C power source is used for more than one filler wire, the arc operates alternately from each electrode. Other variations may also be used. For example, one filler wire connected to a D-C power source and another connected to an A-C power source. Another example is to use three or more filler wires and connect them in many combinations. Connect one D-C source to two wires and one D-C source to the other or connect an A-C source to one wire and a D-C source to each of the other wires. The use of several filler wires and many different power sources are useable depending on the application, welding position, material, etc.

SUMMARY

The present invention provides a guide apparatus for maintaining proper positioning of the electrodes during automatic welding of joints between metal plates. Each welding electrode os suspended in the welding head and is biased toward one of the joint sidewalls. Spacing means are positioned intermediate the electrode and the joint sidewall toward which it is biased in order to maintain the electrode at a constant predetermined lateral distance from the sidewall during travel of the electrode through the joint.

One advantage of the present invention is to provide apparatus for automatically positioning the contact tube or tubes in a spaced relationship with respect to the sidewalls of the joint in spite of irregularities along the length of the joint.

A further advantage of this invention is that it allows satisfactory welds to be made in thick plate of ½-inch and up in all welding positions.

Further understanding of the invention can be accomplished by reference to the attached drawings, wherein:

The figure is partial sectional view through a joint showing an embodiment of this invention which continuously maintains two electrodes in spaced relationship to the joint sidewalls.

Referring to the figure, the welding head 101 includes a shielding gas cup 137 which is attached to a frame (not shown) through the rod 139. The frame is in turn mounted on a moveable welding carriage (not shown). The carriage carries the spools of electrode filler wire and drives the welding head along the joint 22. The filler wires 121—121 and shielding gas pass through the barrel 125 which is also attached to the frame. The barrel 125 supports contact tubes 127–127' through which the filler wires pass. Contact tubes 127–127' are used as originally machined or may be coated with a porcelain enamel or ceramic. The coating prevents the contact tube from shorting to the joint edges when welding narrow-gap openings.

The contact tubes 127–127' are suspended from separate mounts 155 and 157. Mount 155 is provided with a means such as spring 159 that biases contact tube 127 toward sidewall 23. Contact tube 127 is provided with a spring clip or spacer 161 that contacts sidewall 23 and maintains the contact tube 127 a constant distance from sidewall 23 regardless of the irregularities of sidewall 23. Mount 157 is similarly biased with a spring 163 and contact tube 127' provided with a spring clip or spacer 165 to maintain contact tube 127' a constant distance from sidewall 23'.

The frame also supports a forward guide 129 and a rear guide 131 which are positioned in the gap 22 to ride on the bottom of the joint and maintain a constant contact-tube-to-work distance. The guides 129 and 131 are each positioned in a barrel 133 attached to the frame and are each adjustable by means of an adjustment screw (not shown). When the apparatus is used for overhead welding, the head 101 is biased toward the "bottom" of the joint by means of counterweights (not shown) selected to maintain the guides 129 and 131 at a suitable pressure against the "bottom" of the joint.

In the preferred embodiment the shielding gas cup 137 is mounted to float with respect to the head 101 so that the cup is always riding against the top of the plates 21–21. The cup 137 is slideably mounted on the rod 139 affixed to the frame. The shielding cup is also attached to barrels 125 and 133—133 by means of flexible tubes 141. A flexible skirt 143 is also provided around the open end of cup 137. The above arrangement of shielding cup 137, guides 129 and 131, and contact tubes 127-127' provides three shielding gas chambers in the joint. A first chamber is positioned between guide 129 and the nearest contact tube 127; a second chamber is positioned between contact tubes 127-127'; and a third chamber is positioned between guide 131 and the nearest contact tube 127'. Thus, the entire weld area is enclosed in a moving, closed gas chamber.

The apparatus of the present invention is especially useful in combination with apparatus for automatic narrow-gap welding of thick plate. Narrow-gap welding operates in the spray transfer range as contrasted to other automatic or semi-automatic gas-shielded metal-arc processes which operate in the droplet transfer, dip transfer, or shorting-arc range to produce low heat inputs. Narrow-gap welding uses very low heat inputs, often as low as 7500 joules per inch per pass and up to about 30,000 joules per inch per pass with high deposition rates. In narrow-gap welding the electrodes are positioned in a narrow groove in close proximity (substantially 1/16 of one inch) to the joint sidewalls. It is extremely important to maintain the electrodes in a spaced relation with the sidewalls to prevent shorting or arcing to the sidewalls. The guide apparatus of this invention causes the welding head to continually adjust to variations in joint sidewalls and thus substantialy decreases shorting or arcing during narrow-gap welding.

It will be understood, of course, that while the forms of the invention herein shown and described, constitute preferred embodiments of the invention, it is not intended to illustrate all possible forms of the invention. It will also be understood that the words used are words of description rather than of limitation and that various changes in shape, size, and arrangement of parts may be made without departing from the spirit and scope of the invention herein disclosed.

We claim:
1. In apparatus for automatic welding along a weld gap between metal plates having a welding head and a moveable carriage, the improvement of:

(a) means biasing an electrode suspended in the welding head toward one of the gap sidewalls;
(b) spacing means intermediate said electrode and the gap sidewall toward which said electrode is biased and contacting said sidewall for maintaining said electrode at a constant predetermined lateral distance from said sidewall during travel of said electrode along said gap regardless of irregularities in the sidewall.

2. The apparatus of claim 1 wherein said electrode passes through a contact tube which is biased toward one of the gap sidewalls.

3. The apparatus of claim 1 including guide means mounted on said welding head to extend through said gap and ride on the gap bottom.

4. The apparatus of claim 3 wherein two guide means are provided, said guides means being mounted in leading and trailing relationship to said electrode.

5. The apparatus of claim 1 including a floating shielding gas cup attached to the welding head, said gas cup enveloping the area being welded.

6. The apparatus of claim 1 wherein the biasing means are springs.

References Cited

UNITED STATES PATENTS

| | | | |
|---|---|---|---|
| 1,749,765 | 3/1930 | Hendrickson | 219—74 |
| 2,802,931 | 8/1957 | Hess | 219—124 |
| 2,827,548 | 3/1958 | Griswold | 219—125 |
| 2,993,983 | 7/1961 | Carpenter et al. | 219—124 |
| 3,084,246 | 4/1963 | Rieppel et al. | 219—125 |
| 3,123,702 | 3/1964 | Keidel et al. | 219—74 |
| 3,171,012 | 2/1965 | Morehead | 219—124 |
| 3,210,515 | 10/1965 | White | 219—74 |

JOSEPH V. TRUHE, Primary Examiner

W. D. BROOKS, Assistant Examiner

U.S. Cl. X.R.
219—74